United States Patent [19]

Gaeddert

[11] 4,409,783
[45] Oct. 18, 1983

[54] ROTARY BALER WITH IMPROVED ROLLER MOUNTS FOR ENDLESS BELT REPLACEMENT

[75] Inventor: Melvin V. Gaeddert, Newton, Kans.

[73] Assignee: Hesston Corporation, Hesston, Kans.

[21] Appl. No.: 295,844

[22] Filed: Aug. 24, 1981

[51] Int. Cl.³ .................... A01D 59/00; F16C 13/00
[52] U.S. Cl. .................... 56/341; 29/402.08; 29/426.1; 308/190; 384/418
[58] Field of Search ............... 56/341; 29/402.08, 129, 29/426.1; 198/842, 840; 308/20, 190, 189 R; 100/88

[56] References Cited

U.S. PATENT DOCUMENTS

| 1,351,481 | 8/1920 | Lister | 308/190 |
| 2,818,742 | 1/1958 | Veach | 198/842 |
| 4,182,101 | 1/1980 | Gaeddert | 56/341 |
| 4,339,907 | 7/1982 | Kopaska et al. | 100/88 |

Primary Examiner—Gene Mancene
Assistant Examiner—John Weiss
Attorney, Agent, or Firm—Schmidt, Johnson, Hovey & Williams

[57] ABSTRACT

A rotary crop baler belt roller mount is provided which facilitates the changing and installation of endless bale-forming belts. A mount is provided adjacent one end of each transverse belt-supporting roller and includes an annular spacer removably mounted between the end of the roller and the adjacent baler sidewall. Preferably, the spacer is maintained in its operative position by means of a bolt, the bolt passing through the baler sidewall and spacer and being received within a hub assembly secured within the belt roller. In belt changing operations, the spacer can be rapidly removed simply by loosening the associated bolt and withdrawing the spacer. Removal of the spacer from each of the roller mounts in the baler presents a series of belt-clearing gaps adjacent the baler sidewall, allowing quick, easy installation of belts around the belt rollers.

9 Claims, 4 Drawing Figures

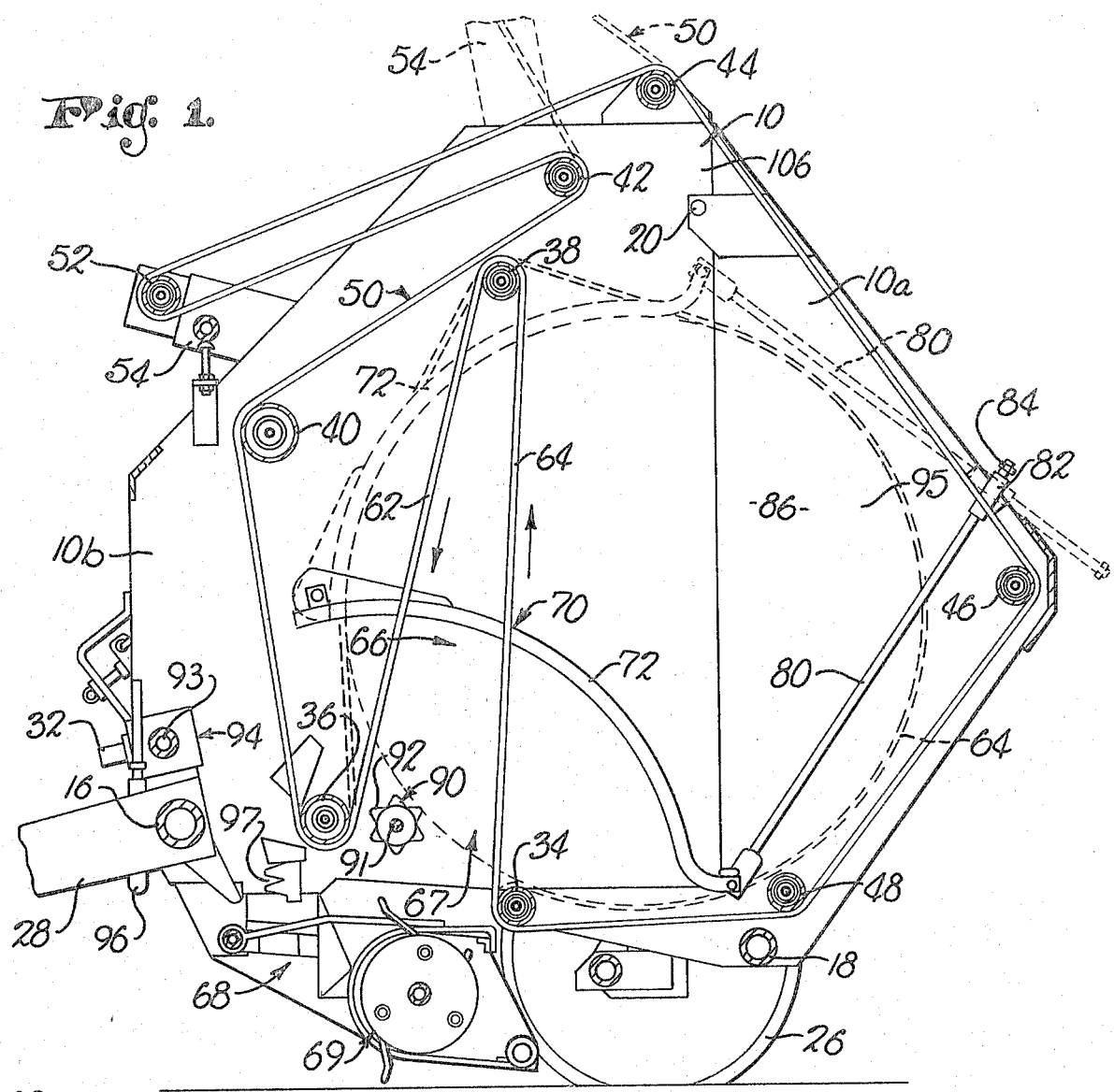
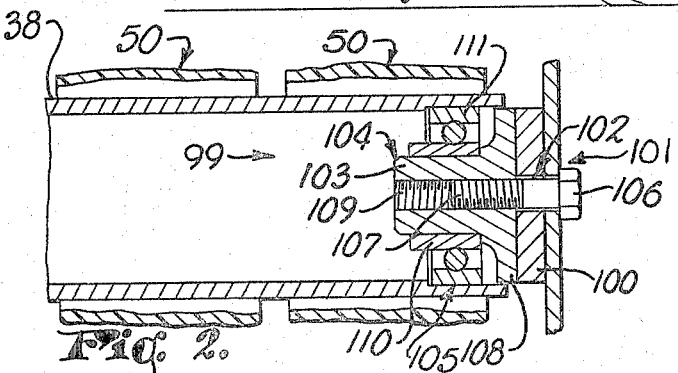
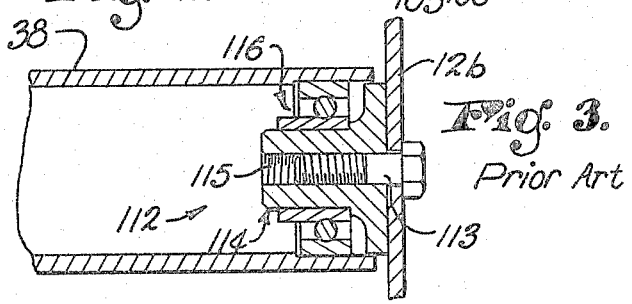
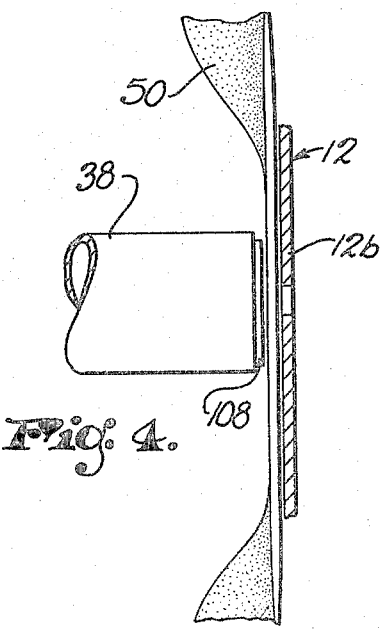
Fig. 1.
Fig. 2.
Fig. 3. Prior Art
Fig. 4.

ROTARY BALER WITH IMPROVED ROLLER MOUNTS FOR ENDLESS BELT REPLACEMENT

BACKGROUND OF THE INVENTION

1. Field of the Invention

The instant invention is broadly concerned with improved structure facilitating the use and replacement of endless belts in so-called "round balers" employed to produce large round bales of crop material. More particularly, it is concerned with a belt roller mount for a round baler, the mount having a removable spacer positioned between the end of the belt roller and the adjacent baler sidewall.

2. Description of the Prior Art

Round balers employ a series of belts trained about a plurality of rotatable horizontal belt rollers. The belt rollers are journalled between a pair of horizontally spaced, upright panels or sidewalls. The rollers are arranged such that the belts define a baling chamber, with the belts moving in opposite directions at opposing portions of the chamber. Crop materials are thereby rotated by the belts to form round bales.

Using endless belts in round balers avoids problems encountered with belts that must be connected at their terminal ends to form continuous loops. The seam or splice in belts which must be joined at their ends is a weak zone that often frays or gives way. The use of endless belts, however, presents installation and replacement problems because the belts must be somehow passed through the normally uninterrupted span cooperatively defined by the rollers and panels.

A rotary crop baler designed to facilitate the replacing of endless belts has been previously disclosed in U.S. Pat. No. 4,339,907, issued July 20, 1982, by Arnold F. Kopaska, et al., entitled "Endless Belt Changing in a Rotary Crop Baler." A crop baler in accordance with that application includes belt rollers comprised of two axially aligned sections. The sections of an individual roller are joined together with a releasable coupling. The releasable coupling is comprised of radial flanges rigidly secured to and tightly surrounding the axially aligned sections. An annular spacer is removably positioned between the opposing faces of the flanges. The spacer is clamped in place between the flanges by a series of circumferentially spaced bolts extending through the flanges and the spacer to draw the two axially aligned sections of the belt roller into tight abutment with the spacer.

The Kopaska invention makes it possible to employ endless belts in rotary crop balers. Replacement of endless belts in accordance with the Kopaska invention, however, requires time-consuming removal of the several bolts placed through each set of the many flanges on the baler.

Furthermore, the specific illustrated embodiment having two sections for each roller causes certain manufacturing and materials supply problems, is not optimum from a cost standpoint, and requires the operator to somehow support both roller halves hanging from their respective sidewalls when the flanges of a roller are unbolted.

SUMMARY OF THE INVENTION

The present invention, therefore, is a marked improvement over the Kopaska invention, in part because the time required to install or replace endless belts is greatly reduced, and the convenience is significantly increased. Additionally, a belt roller mounted in accordance with the instant invention affords the manufacturing economics inherent in a continuous span uninterrupted by central couplings or flanges. Continuous span belt rollers are feasible because the improved design of the roller mounts eliminates completely the need for midspan connections.

The belt roller mount in accordance with the present invention broadly includes an annular spacer removably positioned between the extreme end of the belt roller and the sidewall adjacent the free end of the belt roller. The spacer is positioned on an element projecting inwardly from the sidewall of the baler. The element is threadably received by a member comprising a hub and ball bearing assembly. The hub and ball bearing assembly are partially received within the end of the belt roller, the belt roller being rotatably supported thereon.

In particularly preferred forms, the annular spacer is removably positioned between the hub and the baler sidewall, such that the opposing faces of the spacer are in contact with the hub and sidewall respectively. The inwardly projecting element is preferably a bolt having an externally threaded shank portion. The hub has an internally threaded bore for receiving the shank portion of the bolt. The ball bearing assembly circumscribes the hub and supports the hub within the belt roller. A spacer-engaging portion of the hub projects axially outwardly beyond the end of the roller.

In a simple operation, the mounts at one end of each roller can be disassembled and the spacers removed. An endless belt can then be passed through the gaps defined by the hub and sidewall and easily installed on the belt rollers. The operation may be carried out on the rollers one-at-a-time if desired.

BRIEF DESCRIPTION OF THE DRAWINGS

FIG. 1 is a partially schematic cross-sectional view of a baler having the improvement of the present invention incorporated therein, and with phantom lines depicting the configuration of the baler loaded with a finished round bale;

FIG. 2 is a fragmentary, vertical sectional view of a belt roller and mount therefor in accordance with the invention, shown adjacent the sidewall of the FIG. 1 crop baler;

FIG. 3 is a fragmentary, vertical sectional view of a conventional belt roller and roller mount; and FIG. 4 is a fragmentary view of one of the rollers shown in FIG. 1 with the spacer of the mount removed and an endless belt twisted and slipped edgewise into the clearance between the roller and sidewall.

DESCRIPTION OF THE PREFERRED EMBODIMENT

By way of example, the present invention has been shown in connection with a baler employing a vertically oriented bale-starting chamber as disclosed and claimed in U.S. Pat. No. 4,182,101 entitled "Machine for Coiling Fibrous Crop Material into Large Round Bales," issued Jan. 8, 1980 in the name of Gaeddert, et al., and assigned to the assignee of the present invention. The baler has a pair of laterally spaced, upright sidewalls 10 and 12 that are separated by various transverse structural members, such as at 16 and 18, the sidewall 10 having a rear portion 10a swingably attached to its front portion 10b by a pivot 20. Likewise, the sidewall 12 has a rear portion (not shown) swingably attached to a front portion 12b by a pivot so that, in effect, the rear portions cooperate to form a rear gate for the baler that may be raised to a bale discharge position by hydraulic cylinder assemblies (not shown).

The sidewalls 10 and 12 are supported by a pair of ground-engaging wheels 26 (only one being shown in the drawings) for travel across a field and are also provided with a forwardly extending tongue 28 having a coupling at its forwardmost end for hitching the baler to a suitable towing vehicle. The power take-off shaft of the vehicle (not shown) may be connected with a fore-and-aft extending drive shaft 32 above the tongue 28 for supplying power to the various components of the baler in need of such power.

A plurality of transversely extending rollers span the sidewalls 10 and 12, including a pair of lower rollers 34 and 36 that are spaced apart in a fore-and-aft direction generally in the forward half of the baler. Other transverse rollers include a roller 38 spaced above and somewhat between the two lower rollers 34,36, a roller 40 spaced above and somewhat forwardly of the roller 36, a roller 42 spaced above and somewhat rearwardly of the roller 38, a roller 44 spaced above and somewhat rearwardly of the roller 42, a rear roller 46 spaced substantially below and substantially rearwardly of the roller 44, and a lower rear roller 48 spaced forwardly of the roller 46 and at approximately the same level as the rollers 34. A single, endless, formaminous web in the nature of a series of side-by-side belts 50 is trained about the rollers 34-48 in the manner illustrated in FIG. 1 and also about an additional tensioning roller 52 extending between a pair of arms 54 (only one of which is shown in the drawings) that are swingably attached to the respective sidewalls 10 and 12 about aligned pivots (not shown). Tension springs (not shown) yieldably bias the arms 54 downwardly to their normal position illustrated in solid lines in FIG. 1, but allow the same to swing upwardly to the phantom line position in FIG. 1.

This arrangement of the belts 50 provides for the definition of a bale-starting chamber between the sidewalls 10 and 12 and fore-and-aft stretches 62 and 64 of the belts 50 as illustrated plainly in FIG. 1, such starting chamber being designated by the numeral 66. Inasmuch as the stretches 62 and 64 are essentially upright, the starting chamber 66 is rendered vertically oriented, having an open bottom 67 defined between the rollers 34 and 36, and a top that is defined by an arcuate grid 70 spaced above the rollers 34,36 and crossing the stretches 62,64. An unrestricted, open throat 68 is defined on the immediate upstream side of the open bottom 67 generally between a lower, crop pickup 69 on the one hand and the front roller 36 on the other hand. The grid 70 includes a series of elongated, laterally spaced-apart elements 72 (one only being shown) that are interspersed between adjacent belts 50 of the stretches 62,64, the grid 70 extending entirely across the chamber 66. The forward end of the grid 70 is secured to a transverse pivot 74 spanning the sidewalls 10,12 so as to adapt the grid 70 for vertical swinging movement between the solid position and the phantom line position of FIG. 1, such swinging being yieldably resisted by a spring assembly (not shown) on the outside of the wall 10b that is coupled with a crank (not shown) operably connected to the grid 70. At the rear of the grid 70, a limit rod 80 is pivotally connected at its lower end to the grid 70 and is telescopically received at its upper end by a pivotally mounted tube 82 secured to the rear portion 10a. A nut 84 on the outermost end of the rod 80 limits the extent of downward travel of the rod 80 through the tube 82 and thereby establishes the lower limit of swinging movement of the grid 70.

Swinging of the arms 54 to the phantom position of FIG. 1 releases stored slack in the belts 50 so that the stretches 62,64 can be deflected laterally to their phantom positions of FIG. 1 corresponding to a position of maximum bale growth and also defining the limits of what may be termed a larger baling chamber 86 that has evolved from the chamber 66. The roller 38 remains in a fixed position during such enlargement, and the grid 70 serves as a limit to the upward travel of materials within the chamber 66, the belts 50 normally being driven in such a direction that the stretch 62 is moving downwardly, while the stretch 64 is moving upwardly.

The pickup 69 is suspended immediately below the chamber 66 and substantially between the roller 34 and the roller 36 for lifting materials off the ground and delivering the same directly upwardly into the chamber 66 through the throat 68 and the open bottom 67.

As illustrated best in FIG. 1, the chamber 66 is provided with bale-positioning means in the nature of a roller component 90 spanning the machine between the sidewalls 10,12 and mounted for rotation about a transverse, horizontal axis 91. The roller 90 extends parallel to the roll 36 a short distance behind the latter and at approximately the same level. The periphery of the roller 90 is undulated along the length thereof, such configurations being achieved by the attachment of a plurality of angle members 92 thereto.

As shown in FIG. 1, the shaft 32 makes a right angle connection with a transverse drive shaft 93 within a gear box 94 at the rear of the tongue 28. The shaft 93 distributes driving power to the pickup 69, the belts 50, and the roller 90.

In operation, the pickup 69 is ready to lift the crop materials from the field upon advancement of the baler. As such operation is begun, the stretches 62 and 64 move in opposite, generally vertical directions so that material lifted by the pickup 69 and fed directly up into the chamber 66 is lifted at the rear by the streatch 64 and pulled downwardly at the front by the stretch 62, thereby inducing a rolling action within the chamber 66. The rigid grid 70 contributes to this action, particularly in view of its down-turned arcuate configuration, and the grid also serves to assist in the even distribution of material entirely across the width of the machine within the chamber 66.

As the baler advances and additional material is fed upwardly into the chamber 66 by the pickup 69, the rolling bale presses laterally against the stretches 62,64 and upwardly against the grid, whereby these boundaries for the chamber 66 begin to retract toward their phantom positions of FIG. 1, and the chamber 66 evolves into the chamber 86 conforming in size and shape to that of the finished bale denoted by the numeral 95. Once the bale 95 has achieved this size, advancement of the machine stops while operation of the belts 50 continues so as to spin the bale 95 within the chamber 86 for wrapping with twine from a box (not shown) and distributed by a suitable twine tube mechanism 96. A cutting device 97 severs the twine once the bale 95 has been wrapped several times helically by the twine.

The bale 95 is removed from the baler by raising the portions 10a, 12a upwardly about the pivot 20; the bale 95 is thereby expelled from the chamber 86.

In accordance with my present invention, each roller 34-48 is provided with a belt clearance means in the form of a roller mount 99, but for purposes of illustration, only the roller 38 and its associated mount 99 will be referred to in the following description.

The roller mount 99 broadly includes a spacer 100, along with means referred to by the numeral 101 for removably mounting the spacer 100 adjacent the end of roller 38 and in disposition for spacing the same from the adjacent baler sidewall. The mounting means 101 advantageously includes an element 102, preferably in the form of a bolt, which projects inwardly from the baler sidewall proximal to the adjacent end of roller 38, along with a roller-supporting member 103 comprising a hub 104 and a ball bearing assembly 105.

In more detail, the spacer 100 is in the form an an annular washer-like member having a central bore therethrough. The element or bolt 102 includes an enlarged head 106 and a threaded shank 107 which extends through sidewall 12. As best seen in FIG. 2, the spacer 100 is supported on shank 107 and is in engagement with the inner face of sidewall 12.

The hub 104 includes an annular metallic body 108 having a central, threaded bore 109 therethrough. The body 108 is telescopically received within the end of roller 38 but projects axially therefrom. Again referring to FIG. 2, it will be seen that the shank 107 is threadably received within bore 109 and serves to clamp the spacer 100 between the sidewall 12 and outer face of body 108.

Ball bearing assembly 105 is of conventional construction and is employed to rotatably support roller 38. Briefly, however, it will be observed that the assembly 105 includes an inner race 110 fixedly secured to body 108, along with an outer race 111 secured to roller 38.

In normal operation, the respective roller mounts 99 are assembled in order to rotatably support their associated, transversely extending, belt-supporting rollers, thereby forming continuous, uninterrupted spans across the baler.

When it is desired to change or install endless belts on the baler, it is only necessary to disassemble the respective roller mounts 99 at one end of each roller. This involves loosening and removing the bolts 102 from the bodies 108, whereupon the annular spacers 100 can be removed. This presents a belt-clearing gap between the free end of each of the adjacent rollers and the adjacent sidewall 12. These gaps are sufficient to permit passage of a belt 50 therethrough (see FIG. 4) thereby allowing the belts to be properly installed about the rollers 34-48. When new belts have been installed as described, the respective mounts 99 are simply reassembled by placing the spacers 100 in their appropriate locations and reinstalling the bolts 102. As earlier noted, each roller may be treated individually, if desired, by detaching one end thereof, slipping the belt through the clearance gap, and remounting the roller before moving on to the next roller.

The above situation is to be contrasted with conventional roller mount assembly 112 depicted in FIG. 3. Such units typically include an inwardly extending bolt 113 and a body 114 including a threaded, bolt-receiving bore 115. A ball bearing assembly 116 is employed to rotatably support the associated roller, as illustrated. A review of FIG. 3 will demonstrate that disassembly of conventional roller mount assembly 112 for purposes of endless belt installation would be difficult, if not impossible, owing to the fact that the ball bearing assembly 116 thereof is fixedly secured between the body 114 and the supported roller. Since the roller mount body 114 cannot be removed, there can be no belt-clearing gap. Hence, as a practical matter, it has heretofore been impossible to disassemble such conventional roller mount assemblies for purposes of belt installation. Furthermore, even if it were possible to withdraw the body 114 axially from the bearing 116, such withdrawal could only occur if the opposite end of the roller were first detached from the baler. Only in this way could the roller be oriented in such a manner that the sidewall adjacent the body 114 would not block withdrawal of the body 114. In the present invention, of course, the close proximity of sidewall 12b is of no concern since the hub 104 remains in place and the spacer 100 simply drops out when bolt 102 is removed.

I claim:

1. In a rotary baler having a pair of upright sidewalls spanned by a series of transverse rollers which support endless driven belts looped around the rollers in a manner to engage and coil up crop material into a bale during operation of the belts, an improved mount for at least one end of each of said rollers comprising:

an element having an enlargement disposed externally of the sidewall proximal to said one end of the roller, and an elongated externally threaded element portion projecting inwardly through said proximal sidewall;

means rotatably mounting said one end of the roller on said element portion in spaced relation to said proximal sidewall said mounting means including a member configured to present an internally threaded bore therein for threadably receiving said portion; and a spacer on said element portion between said one end of the roller and the proximal sidewall, said element portion being removable through said proximal sidewall, and said spacer being removable from between said one end of the roller and said proximal sidewall to present a gap through which said belts may be passed during replacement thereof.

2. In the combination as claimed in claim 1, wherein said one end of said roller is tubular, said member being at least partially received within said one end of the roller.

3. In the combination as claimed in claim 2, wherein said member includes a stationary hub having said internally threaded bore, said hub projecting axially outwardly beyond said one end of the roller for abutting contact with said spacer.

4. In the combination as claimed in claim 3, wherein said element is provided with an enlargement on the end thereof remote from said hub in disposition for abutting engagement with said proximal sidewall on the side thereof opposite the roller for clamping the spacer and the proximal sidewall between said enlargement and said hub.

5. In a rotary baler having a pair of upright sidewalls spanned by a series of transverse rollers which support endless, driven belts looped around the rollers in a manner to engage and coil up crop material into a bale during operation of the belts, an improved mount for at least one end of each of said rollers, comprising:

a spacer having a pair of opposed faces; means for rotatably supporting said one end of said roller; and means for removably mounting said spacer adjacent said one end of the roller whereby one of said faces abuts said supporting means and the face opposed to said one face abuts the adjacent sidewall for spacing said one end from said adjacent sidewall, the space between said adjacent sidewall and said supporting means being sufficient, upon removal of said spacer, for presenting a belt-clearing gap through which said belts may be passed during replacement thereof.

6. In the combination as claimed in claim 5, wherein said mount includes:

an element projecting inwardly from the sidewall to a point proximal to said one end of the roller; and said supporting means includes a member configured to present an internally threaded bore therein, said element including an elongated, externally threaded shank portion threadably received by said bore.

7. In the combination as claimed in claim 6, wherein said one end of said roller is tubular, said member being at least partially received within said one end of said roller.

8. In the combination as claimed in claim 7, wherein said member comprises a stationary hub having said internally threaded bore, said hub projecting axially outwardly beyond said one end of the roller for abutting contact with said spacer.

9. In the combination as claimed in claim 8, wherein said element is provided with an enlargement on the end thereof remote from said hub in disposition for abutting engagement with said proximal sidewall on the side thereof opposite the roller for clamping the space and the proximal sidewall between said enlargement and said hub.

* * * * *